W. F. SHERMAN.
GEAR SHIFTING DEVICE FOR FORD AUTOMOBILES.
APPLICATION FILED OCT. 10, 1917.

1,259,919.

Patented Mar. 19, 1918.

Inventor
Walter F. Sherman by Walter E. Ward

Atty.

UNITED STATES PATENT OFFICE.

WALTER F. SHERMAN, OF ELSMERE, NEW YORK.

GEAR-SHIFTING DEVICE FOR FORD AUTOMOBILES.

1,259,919.  Specification of Letters Patent.  Patented Mar. 19, 1918.

Application filed October 10, 1917. Serial No. 195,808.

*To all whom it may concern:*

Be it known that I, WALTER F. SHERMAN, a citizen of the United States, residing at Elsmere, in the county of Albany and State of New York, have invented certain new and useful Improvements in Gear-Shifting Devices for Ford Automobiles, of which the following is a specification.

My invention relates to Ford automobiles and the object of my invention is to provide a hand lever by which the gear may be shifted and held in the desired position.

I accomplish this object by the means of the mechanism illustrated in the accompanying drawings, in which—

Similar letters refer to similar parts throughout the several views.

Figure 1:
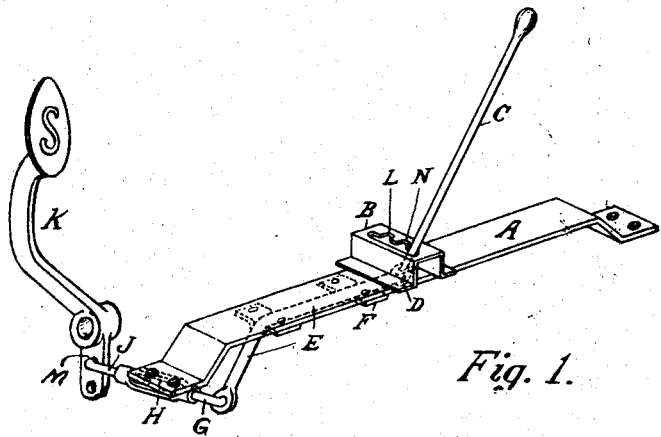
Figure 1 is a perspective view of the apparatus and gear shifting lever to which it is attached.
Figure 2:
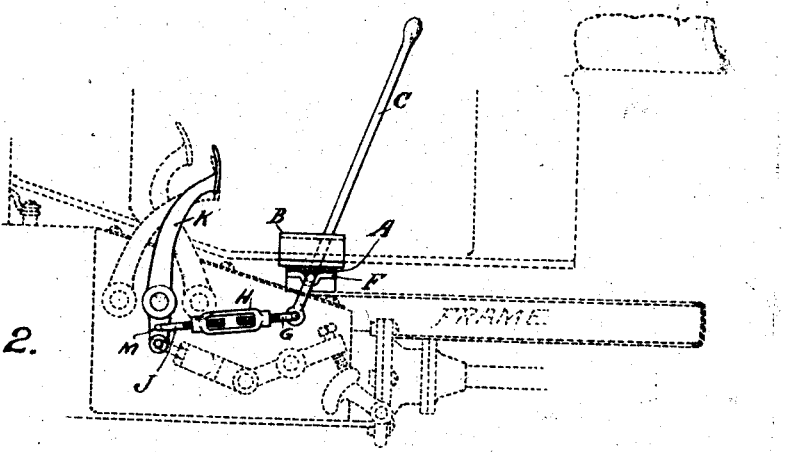
Fig. 2 is a side elevation, partly in section, showing my gear shifting apparatus as applied to a Ford car.

In a Ford automobile, as is well known, the gear shifting is all done by a foot lever and there is nothing to hold the gear in the low speed position except by the continued pressure upon the foot lever. When a loaded truck is used and it is desired to hold the gear at low speed for a considerable time it becomes very wearisome to the operator. By my invention I leave the foot lever, and its connections, exactly as they come from the factory and in addition thereto to operate the shifting lever by a hand lever, as well as the foot lever, and provide notches by which the hand lever may be held at low speed or neutral, if desired.

Referring to the drawings, A represents a bridge, with ends bolted to the frame of the machine, to carry the gear shifting apparatus. The bridge A is preferably made of sheet metal of such width and construction as may be desired and not interfere with the other attachments for operating the machine. Upon the bridge A I place, at a convenient location, the guide portion B and the guide portion B may be of any suitable form of construction.

Preferably, I make a slot in the upper portion of the guide portion B suitable for the gear shifting lever handle C to extend through and move horizontally for the length of the slot. I place notches in the slotted upper portion of the guide portion B, suitable to hold the lever handle C in. C is a lever handle for shifting the gears, suitably located in the guide portion B, to be operated by the driver of the automobile. The lever handle C is hinged at D to an L shaped lever E under the bridge A so as to allow a limited motion to the lever handle C. The L shaped lever E is located, with suitable bearings, under the bridge A and connected by rod G to the gear shifting lever K. G is a connecting rod connecting the lever E with the lever K in any suitable manner. H is a turn buckle for adjusting the length of the rod G. K is the ordinary foot gear shifting lever. The rod G is attached to the lever K below its pivot M. L, L are notches in the guide portion B to hold the lever handle C.

The operation of my apparatus is evident from the foregoing description. The operator moves the lever handle C within the slot in the guide portion B. This moves the L shaped lever E and the gear shifting lever K. When it is desired to hold the gears at low speed the lever handle C is placed in the proper notch in the guide portion B.

What I claim as my invention and desire to secure by Letters Patent is—

In a Ford automobile, a hand lever adapted to move horizontally in a slot, notches in said slot adapted to receive said hand lever, a rotatable L shaped lever attached to said hand lever at one end, an adjustable connecting rod connecting said L shaped lever to the gear shifting lever of said automobile whereby the operator of said hand lever may shift the gears of said automobile, substantially as described and for the purposes mentioned.

In testimony whereof I have affixed my signature.

WALTER F. SHERMAN.